United States Patent
Kataoka

(10) Patent No.: US 9,406,232 B2
(45) Date of Patent: Aug. 2, 2016

(54) DRIVING SUPPORT APPARATUS AND DRIVING SUPPORT METHOD

(75) Inventor: Hiroaki Kataoka, Miyoshi (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 188 days.

(21) Appl. No.: 13/508,213

(22) PCT Filed: Nov. 27, 2009

(86) PCT No.: PCT/JP2009/006446
§ 371 (c)(1),
(2), (4) Date: May 4, 2012

(87) PCT Pub. No.: WO2011/064825
PCT Pub. Date: Jun. 3, 2011

(65) Prior Publication Data
US 2012/0226392 A1  Sep. 6, 2012

(51) Int. Cl.
*G06F 7/00* (2006.01)
*G08G 1/16* (2006.01)
*G06K 9/00* (2006.01)

(52) U.S. Cl.
CPC ............ *G08G 1/167* (2013.01); *G06K 9/00798* (2013.01); *B60T 2201/08* (2013.01)

(58) Field of Classification Search
CPC ............. B60T 2201/08; B62D 15/029; G06K 9/00798; G08G 1/167
See application file for complete search history.

(56) References Cited

U.S. PATENT DOCUMENTS

| | | | |
|---|---|---|---|
| 5,987,174 A * | 11/1999 | Nakamura et al. | 382/199 |
| 6,185,492 B1 * | 2/2001 | Kagawa et al. | 701/41 |
| 7,038,577 B2 * | 5/2006 | Pawlicki et al. | 340/435 |
| 7,532,981 B2 * | 5/2009 | Kataoka et al. | 701/300 |
| 8,279,280 B2 * | 10/2012 | Kim | 348/148 |
| 2003/0045982 A1 | 3/2003 | Kondo et al. | |
| 2004/0102884 A1 * | 5/2004 | Tange et al. | 701/48 |
| 2004/0183663 A1 * | 9/2004 | Shimakage | 340/436 |
| 2005/0273264 A1 | 12/2005 | Gern et al. | |

(Continued)

FOREIGN PATENT DOCUMENTS

| | | |
|---|---|---|
| DE | 102005018697 A1 | 12/2005 |
| DE | 102004026590 A1 | 1/2006 |

(Continued)

OTHER PUBLICATIONS

Dec. 28, 2009 International Search Report issued in International Patent Application No. PCT/JP2009/006446.

*Primary Examiner* — Khoi Tran
*Assistant Examiner* — Ryan Rink
(74) *Attorney, Agent, or Firm* — Oliff PLC

(57) ABSTRACT

A driving support ECU 1 detects for a lane dividing line on a road surface which is travelled upon, by using an image which is taken by a camera 2 and which represents the road surface which is traveled upon and is in front of a vehicle, sets a virtual lane dividing line in a section in which no lane dividing line is drawn, performs a driving support by controlling the vehicle based on the lane dividing line and the virtual lane dividing line, and issues a warning when the vehicle deviates from the virtual lane dividing line. Further, the driving support ECU 1 detects a state of the vehicle, calculates information indicating the state as vehicle information, cancels the driving support when the vehicle information satisfies a predetermined cancel condition, and inhibits the warning when the driving support is canceled.

5 Claims, 13 Drawing Sheets

(56) References Cited

U.S. PATENT DOCUMENTS

| | | | |
|---|---|---|---|
| 2007/0126565 A1* | 6/2007 | Hahn et al. | 340/435 |
| 2008/0024284 A1 | 1/2008 | Baratoff et al. | |
| 2008/0114532 A1* | 5/2008 | Nishida et al. | 701/200 |
| 2009/0030613 A1* | 1/2009 | Kataoka et al. | 701/300 |
| 2009/0259365 A1* | 10/2009 | Rohlfs et al. | 701/41 |
| 2010/0172542 A1* | 7/2010 | Stein et al. | 382/103 |
| 2010/0238283 A1* | 9/2010 | Kim | 348/135 |
| 2011/0010021 A1 | 1/2011 | Kobayashi | |
| 2012/0283912 A1* | 11/2012 | Lee et al. | 701/41 |

FOREIGN PATENT DOCUMENTS

| | | |
|---|---|---|
| JP | A-6-274797 | 9/1994 |
| JP | H06-274797 A | 9/1994 |
| JP | 2001-310719 A | 11/2001 |
| JP | A-2001-310719 | 11/2001 |
| JP | 2002-029438 A | 1/2002 |
| JP | A-2002-29438 | 1/2002 |
| JP | A-2003-44836 | 2/2003 |
| JP | 2003-072578 A | 3/2003 |
| JP | A-2003-281698 | 10/2003 |
| JP | A-2004-178159 | 6/2004 |
| JP | A-2004-268845 | 9/2004 |
| JP | A-2006-331304 | 12/2006 |
| JP | A-2009-143309 | 7/2009 |
| WO | 2005/119624 A1 | 12/2005 |
| WO | 2009/113225 A1 | 9/2009 |

* cited by examiner

F I G. 1 2

| LDW OPERATION CONDITIONS |
|---|
| LKA SWITCH IS ON | — D1a
| TRAVELING IS PERFORMED AT SPEED LESS THAN OR EQUAL TO A PREDETERMINED SPEED v1 | — D1b
| LANE DIVIDING LINES ARE IDENTIFIED | — D1c
| HANDLE-STEERING OPERATION IS NOT INTENTIONALLY PERFORMED IN ORDER TO CHANGE LANES | — D1d
| TURN SIGNAL IS NOT ON | — D1e
| BRAKING OPERATION IS NOT PERFORMED | — D1f
| WINDSHIELD WIPER IS NOT OPERATED | — D1g
| SYSTEM IS NOT ABNORMAL | — D1h

DRIVING SUPPORT APPARATUS AND DRIVING SUPPORT METHOD

TECHNICAL FIELD

The present invention relates to a driving support apparatus and a driving support method, and more particularly to a driving support apparatus and a driving support method capable of issuing a warning to a person in a vehicle when implemented in the vehicle.

BACKGROUND ART

A technique for identifying, by using, for example, a camera mounted to a vehicle, a lane marker (hereinafter, may be simply referred to as a lane dividing line) on a road surface on which the vehicle is travelling, has been known to date. For example, a device disclosed in Patent Literature 1 is an exemplary device for identifying a lane marker on a road surface on which a vehicle is travelling.

CITATION LIST

Patent Literature

Patent Literature 1: Japanese Laid-Open Patent Publication No. 2003-044836

SUMMARY OF THE INVENTION

Problems to be Solved by the Invention

The technique disclosed in Patent Literature 1 is used for estimating, based on one of a right-side lane dividing line or a left-side lane dividing line on a road surface which is travelled upon, the other of the lines as a while line. In the technique disclosed in Patent Literature 1, specifically, a lane dividing line drawn on a road surface which is travelled upon is recognized, and when one of a right-side lane dividing line or a left-side lane dividing line is detected, a position of the other (for example, the left-side lane dividing line) of the lane dividing lines which has not been detected is estimated based on coordinates representing a plurality of sampling points set on the detected lane dividing line (for example, the right-side lane dividing line), road width calculation parameters corresponding to the sampling points, and data representing a road width of a lane in which a vehicle is travelling.

In recent years, a device for identifying a lane dividing line on a road surface on which a vehicle is travelling, by using, for example, a camera mounted to the vehicle, and assisting a driver in a steering operation, based on the identification result, has been put into practical use. For example, a device (for example, referred to as a steering support device) for controlling operations of various devices mounted to a vehicle, and assisting a driver in a driving operation such that the vehicle runs within the lane (an area between a right-side lane dividing line and a left-side lane dividing line), based on the lane dividing line on a road surface which is travelled upon, and which has been detected by using the camera, has been put into practical use. Since such a device is used merely for assisting a driver in a driving operation, in a case where the vehicle is likely to deviate from the right-side lane dividing line or the left-side lane dividing line, the assistance as described above is stopped, in general, so as not to hinder the driver from the driving operation.

Therefore, it is common to mount, to the vehicle, a device (for example, a lane deviation warning device) for issuing an advance warning for the driver of the vehicle when it is determined that the vehicle is likely to deviate from the right-side lane dividing line or the left-side lane dividing line, or when it is determined that the vehicle has deviated from the right-side lane dividing line or the left-side lane dividing line, in addition to the steering support device being mounted to the vehicle.

In a case where a lane dividing line on a road surface on which a vehicle is travelling, is identified by using, for example, the technique disclosed in Patent Literature 1, a position of a lane dividing line having not been detected is estimated, and a virtual lane dividing line is temporarily set for a section in which no lane dividing line is drawn in practice, based on the position having been estimated. In a case where a lane deviation warning is issued based on the virtual lane dividing line having been temporarily set, the lane deviation warning may be issued also in a section in which no lane dividing line is drawn in practice, so that a driver may feel it unreasonable.

The present invention is made in order to solve the above-mentioned problems, and an object of the present invention is to make available a driving support apparatus and a driving support method capable of changing a warning to be issued for a driver depending on vehicle travelling environments.

Solution to the Problems

The present invention has the following features to solve the aforementioned problems.

A first aspect of the present invention is directed to a driving support apparatus that is mounted to a vehicle and that performs a driving support for driving on a traveling lane. The driving support apparatus includes: an image taking section for taking an image of a road surface which is traveled upon and is in front of the vehicle; an image processing section for detecting for a lane dividing line on the road surface which is travelled upon, by using the image taken by the image taking section, and setting a virtual lane dividing line in a section in which no lane dividing line is drawn; a support section for performing the driving support by controlling the vehicle based on the lane dividing line and the virtual lane dividing line; a calculation section for detecting a state of the vehicle, and calculating information indicating the state as vehicle information; a canceling section for canceling the driving support when the vehicle information satisfies a predetermined cancel condition; a warning section for issuing a warning when the vehicle deviates from the virtual lane dividing line; and an inhibition section for inhibiting the warning section from operating when the driving support is canceled.

In a second aspect of the present invention based on the first aspect, the vehicle information calculated by the calculation section is at least one selected from the group consisting of information indicating a speed at which the vehicle travels, information indicating that a brake of the vehicle has been operated, information indicating that a steering wheel of the vehicle has been operated, information indicating a state of a turn signal of the vehicle, and information indicating a state of a windshield wiper of the vehicle.

In a third aspect of the present invention based on the second aspect, the canceling section cancels the driving support when the vehicle information indicates that the speed of the vehicle represents a value greater than or equal to a predetermined value.

In a fourth aspect of the present invention based on the second aspect, the canceling section cancels the driving support when the vehicle information indicates that at least one of the brake, the steering wheel, the turn signal, and the windshield wiper of the vehicle is operated or actuated.

In a fifth aspect of the present invention based on the first aspect, the image processing section detects for the lane dividing line on the road surface which is travelled upon, by using the image taken by the image taking section, and sets the virtual lane dividing line in a section in which the lane dividing line is drawn to neither the right of the vehicle nor the left of the vehicle, or when the lane dividing line is drawn to one of the right and the left of the vehicle.

In a sixth aspect of the present invention based on the fifth aspect, the image processing section sets, when the section in which the lane dividing line is drawn to neither the right of the vehicle nor the left of the vehicle, or when the lane dividing line is drawn to one of the right and the left of the vehicle, has a distance longer than a predetermined distance, the virtual lane dividing line in the section.

In a seventh aspect of the present invention based on the fifth aspect, the section that does not include the lane dividing line for which the virtual lane dividing line is set by the image processing section is at least one selected from the group consisting of a diverging section, a junction section, a lane addition section, an intersection, a section for boarding or exiting a bus at a bus stop, and a carpool lane exit section.

An eighth aspect of the present invention is directed to a driving support method that is implemented in a vehicle and that performs a driving support for driving on a traveling lane. The driving support method includes: an image taking step of taking an image of a road surface which is travelled upon and is in front of the vehicle; an image processing step of detecting for a lane dividing line on the road surface which is travelled upon, by using the image taken by the image taking step, and setting a virtual lane dividing line in a section in which no lane dividing line is drawn; a support step of performing the driving support by controlling the vehicle based on the lane dividing line and the virtual lane dividing line; a calculation step of detecting a state of the vehicle, and calculating information indicating the state as vehicle information; a canceling step of canceling the driving support when the vehicle information satisfies a predetermined cancel condition; a warning step of issuing a warning when the vehicle deviates from the virtual lane dividing line; and an inhibition step of inhibiting the warning step from operating when the driving support is canceled.

Advantageous Effects of the Invention

According to a first aspect of the present invention, for example, in a case where the driving support is canceled, the warning to be issued when the vehicle deviates from the virtual lane dividing line is canceled, so that feeling of unreasonableness caused by the warning being issued in a place including no lane dividing line can be alleviated. In a case where the driving support is canceled, the warning to be issued when the vehicle deviates from the virtual lane dividing line is canceled. In other words, in a case where the driving support is being performed, if the vehicle deviates from the virtual lane dividing line, the warning can be issued. Thus, for example, in a case where the driving support based on the traveling lane is being performed, if the vehicle deviates from the lane dividing lines including the virtual lane dividing line, the warning is issued. Therefore, in a section for which a warning is necessary when the vehicle deviates from the lane dividing lines including the virtual lane dividing line, the warning can be issued, while in a section in which a driver feels unreasonable if the warning is issued, issuance of the warning can be prevented. Namely, the warning issued for the driver can be changed according to the vehicle traveling environment.

According to the second aspect of the present invention, the driving support can be canceled according to a driving operation performed by a driver.

According to the third aspect of the present invention, the driving support can be canceled according to a vehicle speed.

According to the fourth aspect of the present invention, for example, when a driver operates a steering wheel, a turn signal, or the like in order to change lanes, a warning for the virtual line is not issued, so that a driver does not feel it unreasonable that a warning is issued in practice in a place including no lane dividing line. In other words, even if a vehicle deviates from the virtual line when the driver intentionally changes a vehicle traveling direction, no warning is issued, thereby preventing the driver from feeling unreasonable.

According to the fifth aspect of the present invention, the virtual line can be set not only in a section in which one of the right-side lane dividing line or the left-side lane dividing line is not drawn, but also in a section in which neither the right-side lane dividing line nor the left-side lane dividing line is drawn.

According to the sixth aspect of the present invention, the virtual line can be set according to a distance of a section including no lane dividing line. Namely, for example, the virtual line can be prevented from being set in a section in which only a portion of the lane dividing line for division from an opposing lane is faint or broken, and a state in which a warning is not issued in a section in which the warning is actually necessary can be prevented.

According to the seventh aspect of the present invention, the virtual line is set in a section in which particularly unreasonable feeling occurs if a warning is issued in a place including no lane dividing line, and whether or not the warning for the virtual line is to be issued is determined, so that the driver's feeling of unreasonableness can be further alleviated.

The driving support method of the present invention enables the same effect as obtained by the driving support apparatus of the present invention as described above to be obtained.

BRIEF DESCRIPTION OF THE DRAWINGS

FIG. 12 is a diagram illustrating exemplary LDW operation conditions.

DESCRIPTION OF EMBODIMENTS

Figure 1:
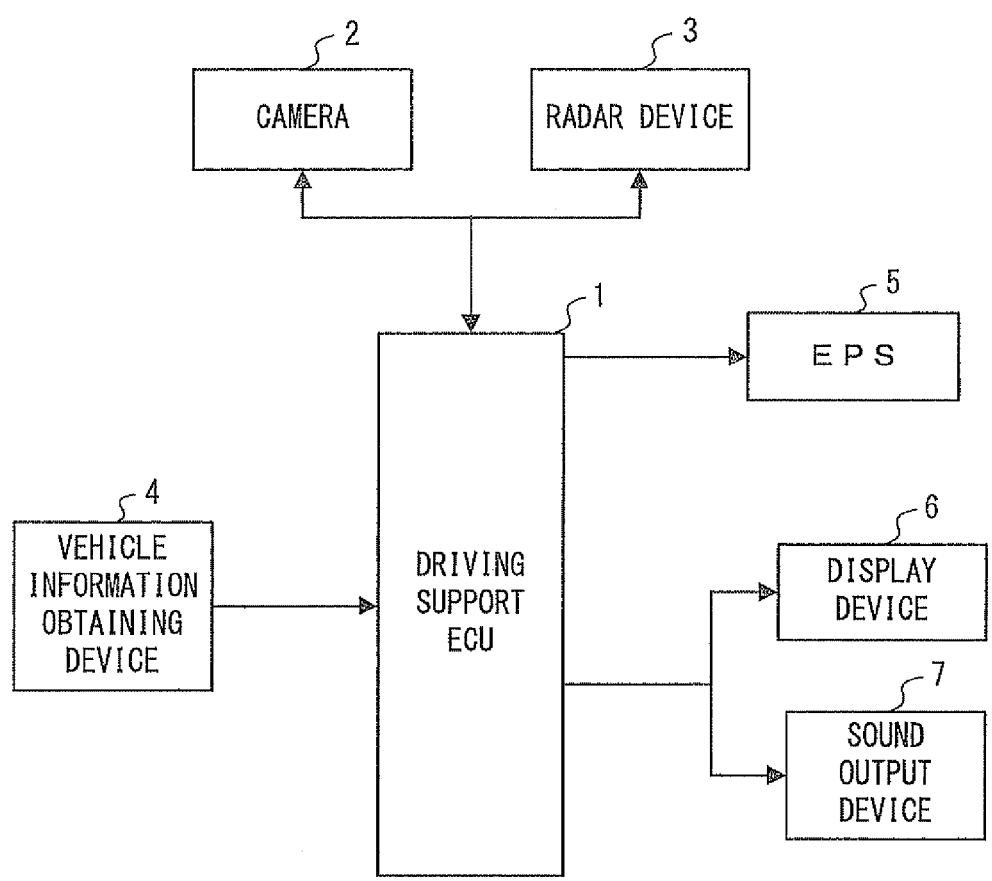
FIG. 1 is a block diagram illustrating an exemplary configuration of a driving support apparatus.

Hereinafter, a driving support apparatus according to an embodiment of the present invention will be described with reference to the drawings. In the present embodiment, an exemplary case in which the driving support apparatus is mounted to a vehicle (specifically, it is assumed that it is mounted to a passenger car that is hereinafter represented as an own vehicle my) will be described. FIG. 1 is a block diagram illustrating an exemplary configuration of the driving support apparatus.

In FIG. 1, the driving support apparatus includes a driving support ECU (Electrical Control Unit) 1. To the driving support ECU 1, a camera 2, a radar device 3, a vehicle information obtaining device 4, an electric power steering (hereinafter, referred to as an EPS) 5, a display device 6, a sound output device 7, and the like are connected.

The driving support ECU 1 controls, for example, the EPS 5, the display device 6, and the sound output device 7 mounted to the own vehicle my, based on information from the camera 2, the radar device 3, the vehicle information obtaining device 4, and the like, which will be described below, and supports the driver's driving.

The camera 2 is, for example, a CCD camera, a CMOS camera, or an infrared camera, and takes an image of a region in front of the own vehicle my. For example, the camera 2 takes an image of a region in front of the own vehicle my at predetermined time intervals, and outputs the taken image to the driving support ECU 1. The camera 2 is mounted, for example, behind a rearview mirror, so as to orient the camera 2 in a direction in which the own vehicle my is travelling, such that the camera 2 takes an image of a region in front of the own vehicle my, without hindering a driver from driving. The camera 2 represents an example of an image taking section in claims.

The radar device 3 is mounted to the own vehicle my at a predetermined position (for example, a position at which a headlight or a direction indicator is mounted), and emits an electromagnetic wave outwardly of the own vehicle my, and monitors a region in front of the own vehicle my. Specifically, the radar device 3 emits an electromagnetic wave toward the region in front of the own vehicle my, and detects for a target (an object such as another vehicle, a bicycle, a walking person, and a building) in a range detectable by the radar device 3. The radar device 3 detects, for example, a target in the regions in front of and lateral to the own vehicle my, and outputs, to the driving support ECU 1, a signal indicating that the target has been detected.

The vehicle information obtaining device 4 obtains information associated with travelling of the own vehicle my. Examples of the vehicle information obtaining device 4 include a vehicle speed detection device for detecting a vehicle speed at which the own vehicle my travels, and a steering torque detection device, mounted to a steering rod of a steering wheel of the own vehicle my, for detecting a steering torque applied to the steering wheel.

Further, examples of the vehicle information obtaining device 4 include a device for actuating a windshield wiper of the own vehicle my, a device for lighting a direction indicator up, and a brake device for the own vehicle my. Namely, the vehicle information obtaining device 4 obtains, when, for example, the windshield wiper has been actuated, the direction indicator has been lit up, or a braking operation is performed by a driver of the own vehicle my, information indicating that the driver has performed such actuation, operations, or the like Further, the vehicle information obtaining device 4 also obtains information indicating whether a switch for starting or stopping various controls for supporting a driver's driving is ON or OFF. The various controls for supporting the driver's driving are generically referred to as a safety action.

Examples of various safety actions performed by the driving support ECU 1 will be described.

The driving support ECU 1 controls an operation performed by each of the various devices (such as the EPS 5 described below) mounted to the own vehicle my, based on lane markers (a right-side lane dividing line and a left-side lane dividing line) of a road surface which is travelled upon and which has been detected by the camera 2, and supports, for example, driving such that the own vehicle my runs within the lane (an area between the right-side lane dividing line and the left-side lane dividing line). The driving support ECU 1 represents examples of an image processing section, a support section, a calculation section, a canceling section, and an inhibition section in claims.

On the other hand, if it is assumed that the own vehicle my is likely to deviate from a lane (an area between the right-side lane dividing line and the left-side lane dividing line) in which the own vehicle my is to travel although this is not intended by a driver of the own vehicle my, the EPS 5 described below assists the driver in a steering operation, or controls operations of the various devices (such as the EPS 5 described below) mounted to the own vehicle my so as to, for example, cause the own vehicle my to run near the center between the lane dividing lines when, for example, a possibility that the own vehicle my deviates from the traveling lane is high, according to an instruction from the driving support ECU 1, thereby supporting the driver's steering operation.

The control performed when the driving support ECU 1 determines that the own vehicle my deviates from a lane (an area between the right-side lane dividing line and the left-side lane dividing line) in which the own vehicle my is to travel is not limited to supporting a steering operation performed by a driver as described above, and may be an action to be done for causing the own vehicle my to safely run in the traveling lane based on an image taken by the camera 2. Further, in the following description, the control for the action to be done by the driving support ECU 1 for causing the own vehicle my to safely run within the traveling lane, based on an image taken by the camera 2, is particularly referred to as an LKA (Lane keep Assist) control.

Further, when it is determined that the own vehicle my is likely to deviate from a traveling lane (the area between the right-side lane dividing line and the left-side lane dividing line) in which the own vehicle my is to travel or that the own vehicle my has deviated from the traveling lane although this is not intended by a driver, the driving support ECU 1 issues an advance warning for a driver of the own vehicle my by using the display device 6 or the sound output device 7 described below, based on a lane marker (the right-side lane dividing line and the left-side lane dividing line) on a road surface which is travelled upon and which has been detected by the camera 2. A control performed by the driving support ECU 1 for issuing a warning by using the display device 6 or the sound output device 7 described below, based on an image taken by the camera 2, is particularly referred to as an LDW (Lane Departure Warning) control.

In general, the LKA control described above is stopped so as not to hinder a driver from performing driving operation when some degree of deviation from the right-side lane dividing line or the left-side lane dividing line has occurred. Therefore, the LDW control is performed such that a warning notifying a driver that the LKA control is stopped, is issued by using the display device 6 or the sound output device 7, for some time periods before the LKA control is stopped, namely, a limitation of the support performed by the LKA control is indicated to the driver in advance.

Thus, when it has been determined that the own vehicle my deviates from the lane dividing line, by using the information (specifically, an image, taken by the camera 2, representing a region in front of the own vehicle my) obtained from the camera 2, the driving support ECU 1 issues a warning or an alarm to the own vehicle my and a driver of the own vehicle my or supports a steering operation (namely, the LDW control and the LKA control) so as to cause the own vehicle my to safely run within the traveling lane, so that a danger can be forestalled in a state where safety is endangered, for example, in a state where an accident is likely to occur. In the following description, the LAK control, the LDW control, and the like described above may be generically referred to as a lane keeping control.

The driving support ECU 1 may do, for example, an action for safety as described below, in addition to the lane keeping control (the LKA control and the LDW control) described above.

For example, the driving support ECU 1 performs a control for maintaining a distance between the own vehicle my and another vehicle travelling in front of the own vehicle my such that the distance becomes constant, based on the information obtained from the radar device 3. Further, when the driving support ECU 1 determines that the own vehicle my is likely to contact with another vehicle by the own vehicle my approaching the other vehicle travelling at a low speed in front of the own vehicle my, a warning is issued for a driver of the own vehicle my by using the display device 6 or the sound output device 7 shown in FIG. 1, and/or an engine ECU (not shown) is instructed to decrease a speed of the own vehicle my. Further, the driving support ECU 1 determines, based on the information obtained from the radar device 3, whether or not there is a danger that an object (such as another vehicle or a roadside object) and the own vehicle my are likely to collide with each other, and, when the danger of the collision with the object is high, the driving support ECU 1 issues a warning for a driver, or controls a brake device (not shown) mounted to the own vehicle my to assist the driver in braking operation. Further, when the driving support ECU 1 determines that a collision between the object and the own vehicle my cannot be avoided, a seat belt is wound or a seat is driven, to enhance a restraining effect for a person in the own vehicle my, thereby reducing damage from the collision.

Returning to description with reference to FIG. 1, the EPS 5 assists a driver in a steering operation, or supports a driver's handle steering operation so as to cause the own vehicle my to run within a lane (near the center of the area between the right-side lane dividing line and the left-side lane dividing line) when, for example, a possibility that the own vehicle my deviates from the traveling lane is high, according to an instruction from the driving support ECU 1. Although the EPS 5 is illustrated in FIG. 1, for example, an engine ECU (not shown) for controlling a torque of an engine of the own vehicle my, or a brake device (not shown) for assisting a driver of the own vehicle my in a braking operation may be actuated according to an instruction form the driving support ECU 1, in addition to the EPS 5 being actuated. Namely, a device for dynamically controlling the own vehicle my according to an instruction from the driving support ECU 1, to execute the lane keeping control, is not limited to the EPS 5.

Next, the display device 6 shown in FIG. 1 is a display medium mounted at a position (for example, inside a measuring instrument panel in front of a driver' seat) at which a driver who is seated in the driver's seat in the own vehicle my and drives the own vehicle my can visually check the display device 6. Such a display medium is, for example, a liquid crystal display, a light emitting diode (LED), or an organic EL display. Further, the display device 6 may be another display device such as a head-up display that has a half mirror (reflective glass) on a portion of a windshield glass in front of the driver's seat, and fluorescently-displays, on the half mirror, a virtual image such as information. Thus, the driver of the own vehicle my is allowed to confirm information displayed on the display device 6 while the driver is seated in the driver's seat and faces forward (in the traveling direction).

The sound output device 7 provides a driver of the own vehicle my with various information by using sound. Specifically, the sound output device 7 notifies the driver of a warning or information according to an instruction form the driving support ECU 1. Specifically, the sound output device 7 is implemented as, for example, a speaker mounted to the own vehicle my. The sound output device 7 represents an example of a warning section in claims.

Figure 2:
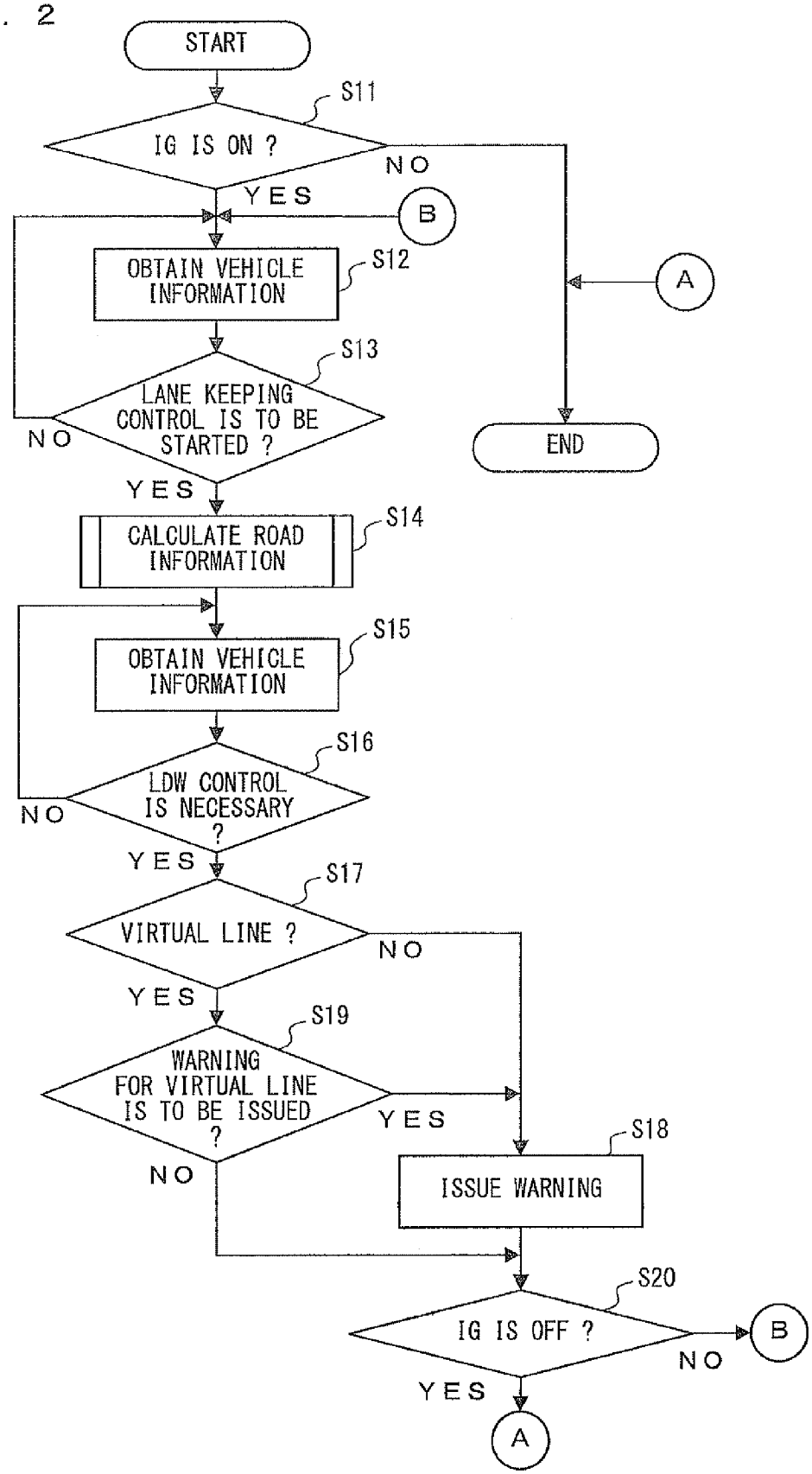
FIG. 2 is a flow chart showing an exemplary flow of a process performed by a driving support ECU 1.

Next, an exemplary flow of a process performed by the driving support ECU 1 of the driving support apparatus according to the present embodiment will be described with reference to FIG. 2. FIG. 2 is a flow chart showing an exemplary flow of a process performed by the driving support ECU 1 of the driving support apparatus according to the present embodiment. The process of the flow chart shown in FIG. 2 is executed by, for example, the driving support ECU 1 executing a predetermined program that is stored in a not-illustrated storage section included in the driving support ECU 1. Further, the process of the flow chart shown in FIG. 2 is started when a power source for the driving support ECU 1 is set to be ON (for example, when an ignition switch of the own vehicle my to which the driving support apparatus is mounted is set to be ON). Further, the process of the flow chart is ended when the power source for the driving support ECU 1 is set to be OFF (for example, when the ignition switch of the own vehicle my to which the driving support apparatus is mounted is set to be OFF). In the following description, the ignition switch is referred to as an IG.

Although the driving support ECU 1 of the driving support apparatus according to the present embodiment executes various safety actions described above, the LKA control and the LDW control, that is, the lane keeping control, among the various safety actions, will be mainly described with reference to the flow chart.

Firstly, in step S11 shown in FIG. 2, the driving support ECU 1 determines whether or not the IG is ON. When the IG is determined to be ON (YES), the process is advanced to the subsequent step S12. On the other hand, when the driving support ECU 11 determines that the IG is not ON, that is, when the IG is determined to be OFF (NO), the process of the flow chart is ended.

In step S12, the driving support ECU 1 obtains vehicle information on the own vehicle my from the vehicle information obtaining device 4. In step S12, the vehicle information obtained from the vehicle information obtaining device 4 by the driving support ECU 1 is, for example, information indicating that a switch (for example, an LKA main switch) for performing the lane keeping control is pressed by a driver.

In step S13, the driving support ECU 1 determines whether or not the lane keeping control is to be started. Specifically, the driving support ECU 1 determines whether or not the lane keeping control is to be started, with reference to the vehicle information obtained in step S12. For example, the driving support ECU 1 makes an affirmative determination (YES) when, for example, the vehicle information obtained in step S12 indicates that the LKA main switch is pressed by the driver, and advances the process to the subsequent step S14. On the other hand, when, for example, the vehicle information obtained in step S12 indicates that the LKA main switch is not pressed by the driver, the driving support ECU 1 makes a negative determination (NO), and returns the process to step S12.

In step S14, the driving support ECU 1 calculates road information. Hereinafter, a process performed in step S14 by the driving support ECU 1 for calculating the road information will be described with reference to FIG. 3.

Figure 3:
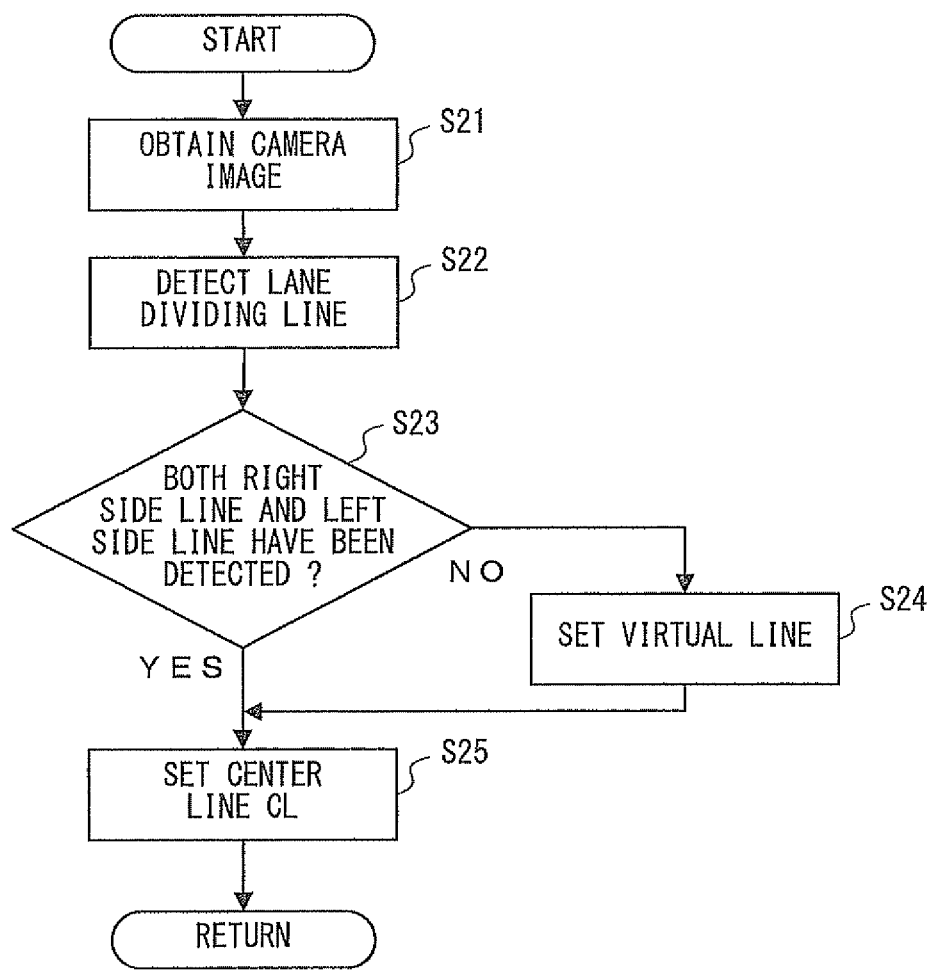
FIG. 3 is a flow chart showing a process step performed in step S14 shown in FIG. 2.

FIG. 3 is a flow chart showing an exemplary process step performed in step S14 shown in FIG. 2 by the driving support ECU 1 for calculating the road information.

In step S21 shown in FIG. 3, the driving support ECU 1 obtains a camera image from the camera 2. Specifically, the driving support ECU 1 obtains, from the camera 2, an image that is taken by the camera 2, and that represents a region in front of the own vehicle my, that is, an image representing a road surface which is travelled upon and is in front of the own vehicle my. The driving support ECU 1 advances the process to the subsequent step S22.

In step S22, the driving support ECU 1 detects for a lane dividing line. Specifically, the driving support ECU 1 detects for a right-side lane dividing line and a left-side lane dividing line (i.e., lines drawn on both sides of the road surface on which the own vehicle my is travelling) by performing a process of extracting edge points from the image (image representing the road surface in front of the traveling vehicle) obtained in step S21. The driving support ECU 1 advances the process to the subsequent step S23.

When the driving support ECU 1 detects neither the right-side lane dividing line nor the left-side lane dividing line in step S22, a center line (a line that functions as a target track based on which the own vehicle my is to travel) described below cannot be determined. The driving support ECU 1 determines whether or not both the right-side lane dividing line and the left-side lane dividing line have been detected, in step S23 subsequent to step S22. When the driving support ECU 1 makes an affirmative determination (YES) in step S23, the process is advanced to step S25. On the other hand, when the driving support ECU 1 makes a negative determination (NO) in step S23, the driving support ECU 1 advances the process to step S24, and sets a virtual lane dividing line.

A process step of step S24 performed by the driving support ECU 1 will be described. Namely, a process step of setting, when neither the right-side lane dividing line nor the left-side lane dividing line have been detected by the driving support ECU 1, or when only one of the right-side lane dividing line or the left-side lane dividing line has been detected by the driving support ECU 1, a virtual lane dividing line (hereinafter, simply referred to as a virtual line) on the side(s) for which no lane dividing line has been detected, will be described.

An exemplary case where only one of the right-side lane dividing line or the left-side lane dividing line has been detected is, for examples, the following cases. The exemplary case is, for example, a case where either one of the right-side lane dividing line or the left-side lane dividing line is not drawn, and an edge cannot be detected, or a case where one of the right-side lane dividing line or the left-side lane dividing line is too faint to be identified by the camera 2.

More specifically, a case where either one of the right-side lane dividing line or the left-side lane dividing line is not drawn, and an edge cannot be detected is, for example, (i) a case for a section in which the lane dividing line is not drawn on either one of the right side or the left side of the road surface which is travelled upon, (ii) a case for a section in which the number of lanes is increased on the road surface which is travelled upon, and (iii) a case for a section in which the width of the lane on the road surface which is travelled upon is changed.

The specific examples of the cases (i) to (iii) will be described with reference to FIG. 4 to FIG. 9. In FIG. 4 to FIG. 9, it is assumed that the own vehicle my is travelling on a road surface in a country (for example, the U.S. or Europe) where vehicles keep to the right side of the road. For the following description, reference characters and arrows are indicated in FIG. 4 to FIG. 9.

Figure 4:
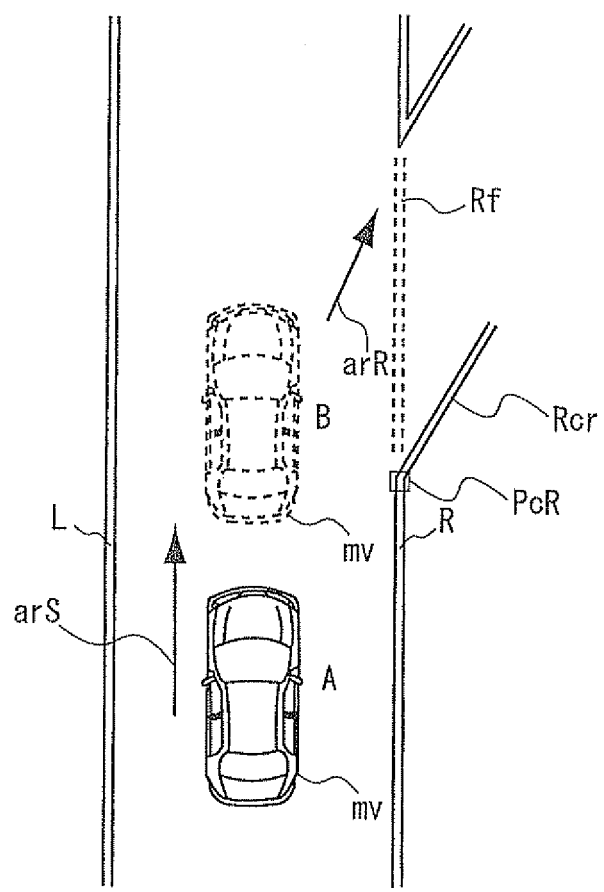
FIG. 4 is a diagram illustrating a diverging section in which no lane dividing line is drawn on one of the right side or the left side of a road surface which is travelled upon.
Figure 5:
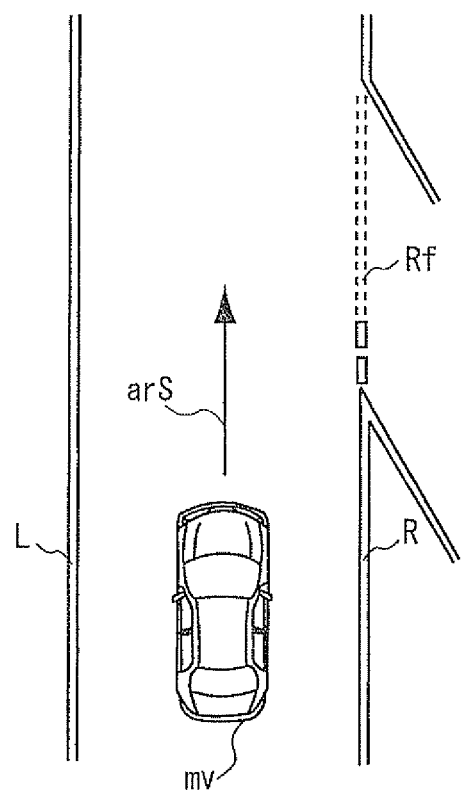
FIG. 5 is a diagram illustrating a junction section in which no lane dividing line is drawn on one of the right side or the left side of a road surface which is travelled upon.
Figure 6:
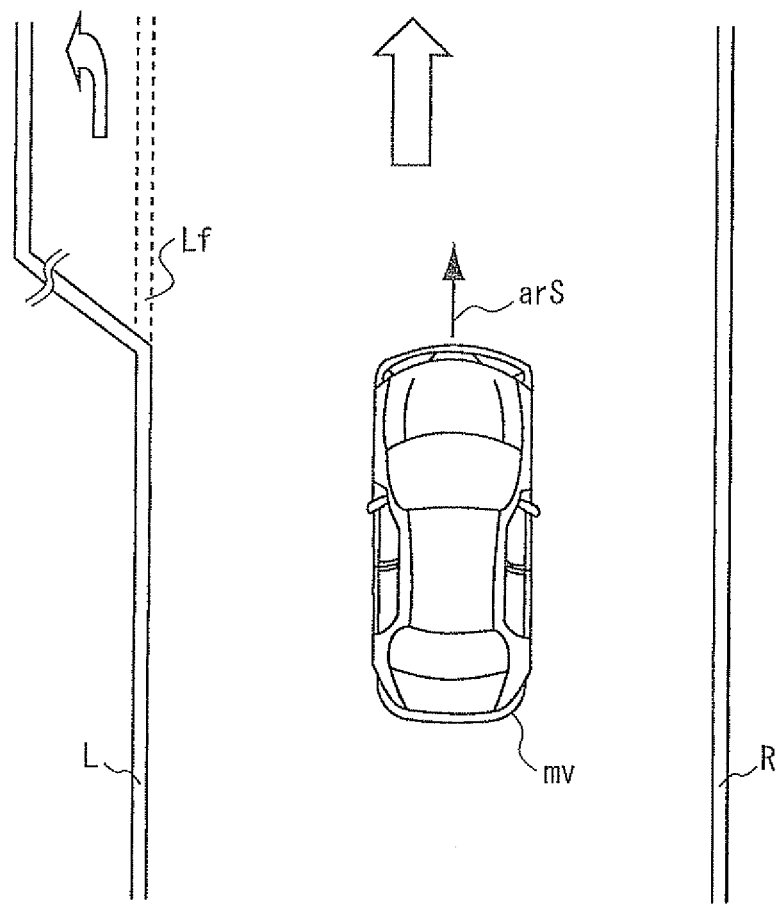
FIG. 6 is a diagram illustrating a road surface which is travelled upon and on which a right turn lane or a left turn lane having no lane dividing line drawn appears.

For example, the exemplary case (i) may represent, for example, a diverging section in which no lane dividing line is drawn on one of the right side or the left side of the road surface which is travelled upon, as shown in FIG. 4 (FIG. 4 shows an exemplary case in which the lane dividing line is not drawn to the right of the own vehicle mv). Further, the exemplary case (i) may represent, for example, a junction section in which no lane dividing line is drawn on one of the right side or the left side of the road surface which is travelled upon, as shown in FIG. 5 (FIG. 5 shows an exemplary case in which the lane dividing line is not drawn to the right of the own vehicle mv). Furthermore, the exemplary case (i) may represent, for example, a road surface which is travelled upon and on which a right or a left turn lane having no lane dividing line drawn appears, as shown in FIG. 6 (FIG. 6 shows a left turn lane having no lane dividing line drawn).

Figure 7:
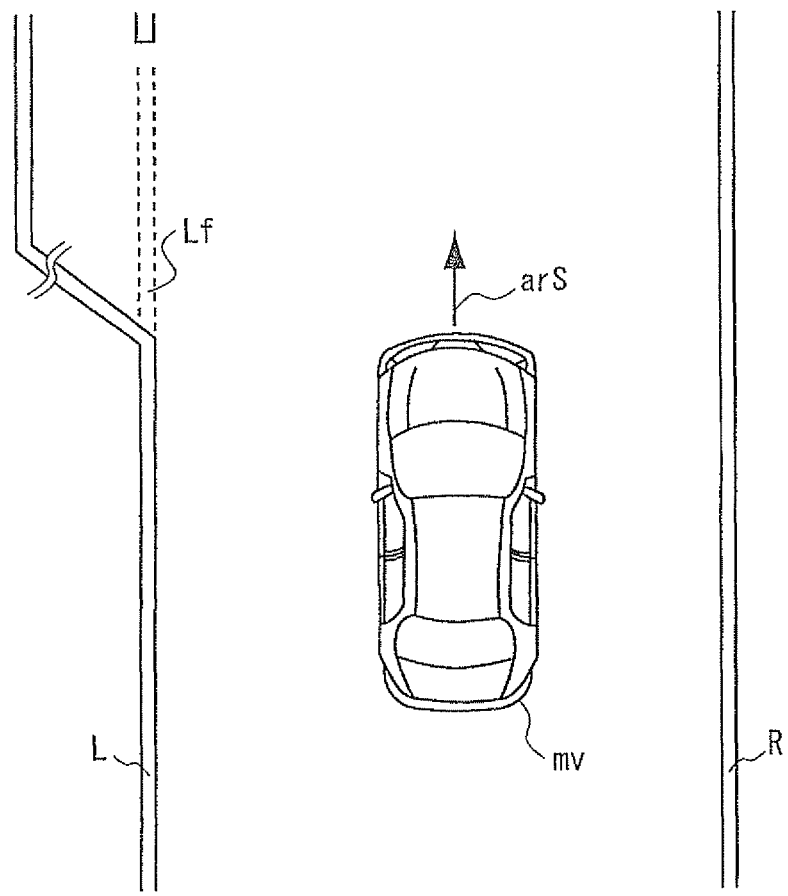
FIG. 7 is a diagram illustrating a section including a passing lane.

Further, the exemplary case (ii) may represent, for example, a section in which a passing lane appears to the left of the own vehicle my, as shown in FIG. 7. The exemplary case (ii) may also represent a road surface which is travelled upon and on which a right or a left turn lane having no lane dividing line drawn appears, as shown in FIG. 6.

Figure 8:
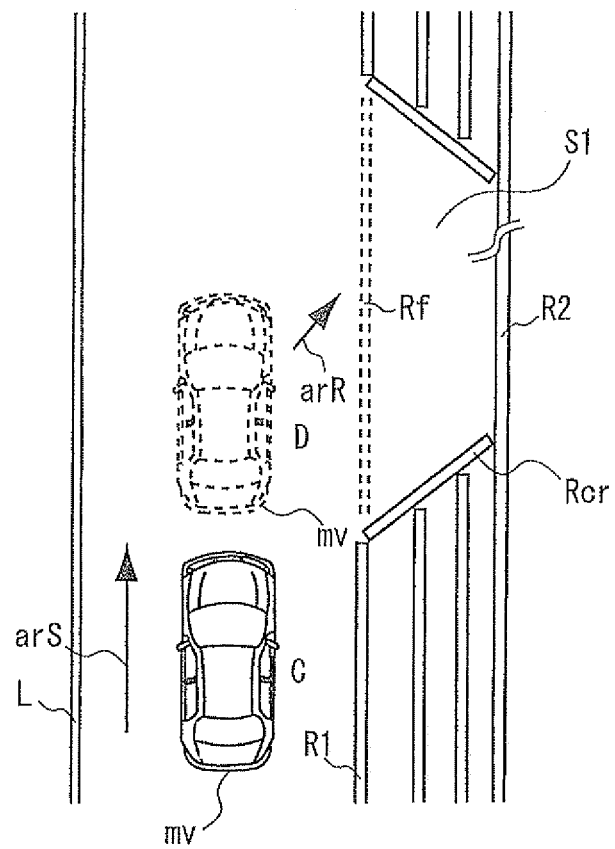
FIG. 8 is a diagram illustrating a carpool lane.
Figure 9:
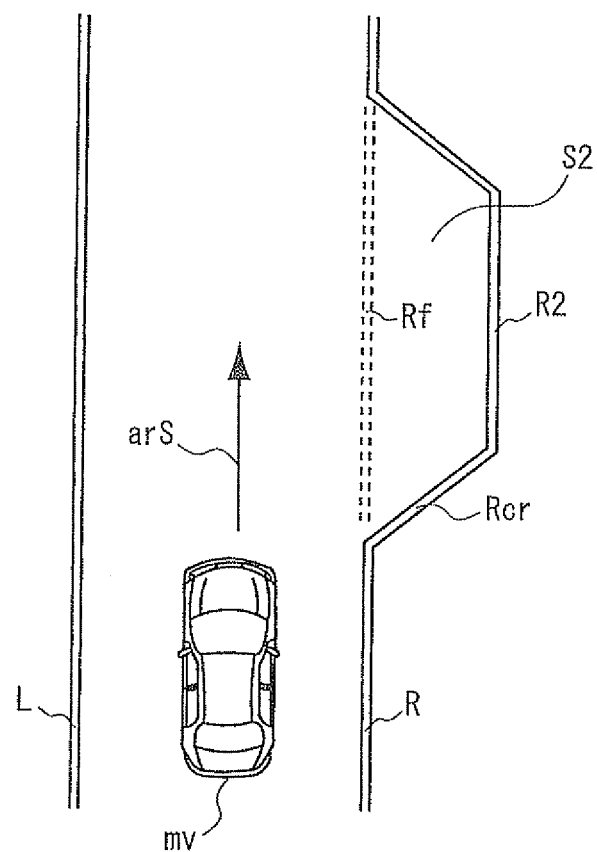
FIG. 9 is a diagram illustrating a section for boarding or exiting a bus at a bus stop.

Furthermore, the exemplary case (iii) may represent, for example, an exit section S1 of a carpool lane as shown in FIG. 8, and a section S2 for boarding or exiting a bus at a bus stop as shown in FIG. 9. The carpool lane is a traveling lane that is adopted in some countries (for example, the U.S.), and vehicles in each of which plural persons are seated, or vehicles that meet environmental standards are exclusively allowed to travel in the carpool lane. The carpool lane is distinguished from other lanes by, for example, one border line on the left side which is colored in yellow, orange, or the like, and a plurality of border lines on the right side. Further, the lines on the right side are slanted inward in an entrance portion of the carpool lane, to form an entrance for guiding the vehicles into the carpool lane, and the lines on the right side in an exit portion of the carpool lane are bent outward such that the lane diverges. In the example shown in FIG. 8, the own vehicle my is travelling near an exit and entrance section of the carpool lane.

Cases in which the determination is negative in step S23 include (iv) a case in which neither the right-side lane dividing line nor the left-side lane dividing line is detected.

Figure 10:
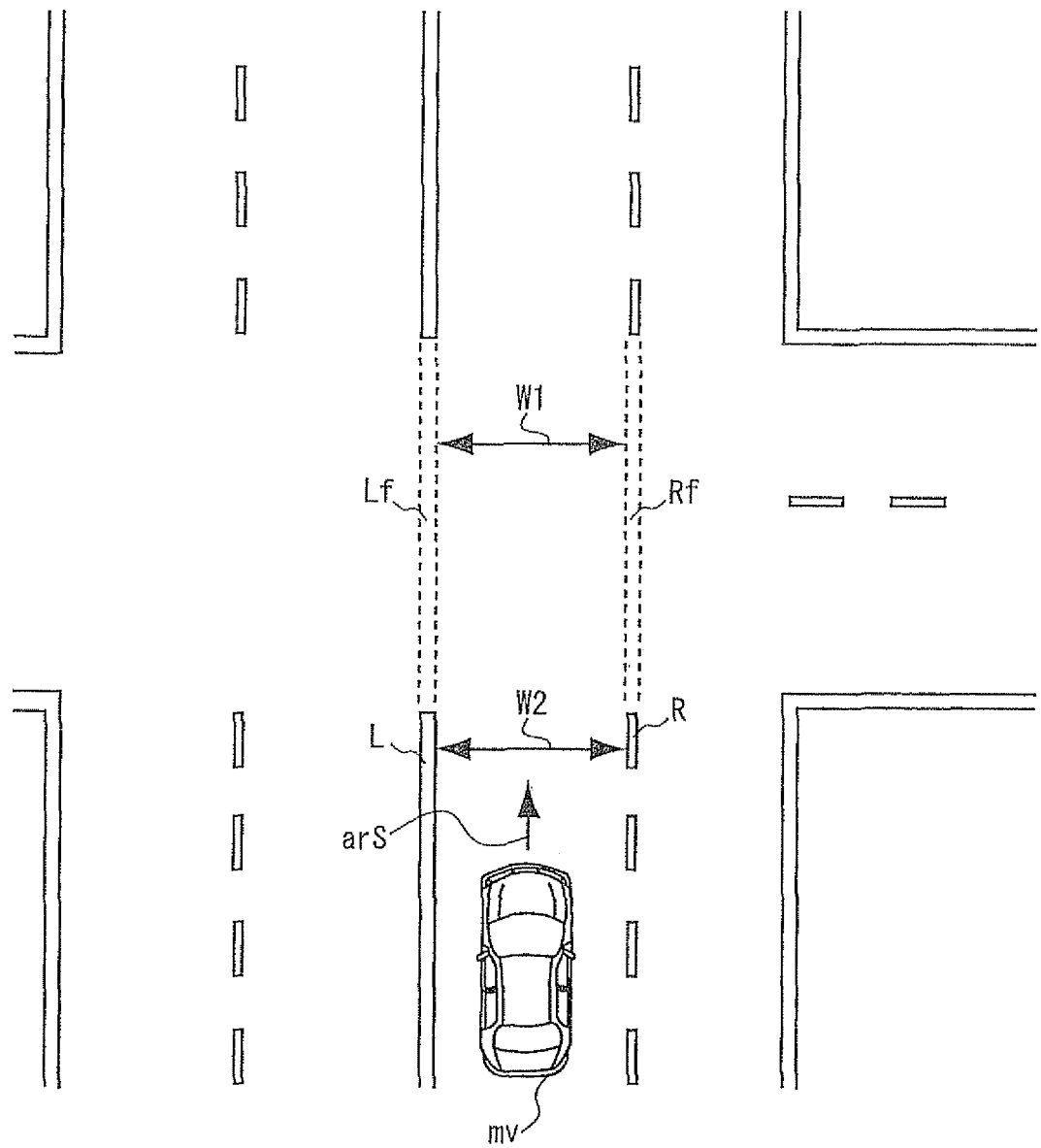
FIG. 10 is a diagram illustrating an intersection.

Specific examples of a section (iv) in which neither the right-side lane dividing line nor the left-side lane dividing line is detected, include an intersection, as shown in FIG. 10, at which neither a right-side lane dividing line nor a left-side lane dividing line is drawn.

Returning to the flow chart shown in FIG. 3, in step S24, when neither the right-side lane dividing line nor the left-side lane dividing line have been detected, or when only one of the right-side lane dividing line or the left-side lane dividing line has been detected, as illustrated in FIG. 4 to FIG. 10, the driving support ECU 1 sets a virtual line on the side(s) for which no lane dividing line has been detected.

In step S24, firstly, in a first method, when either one of the right-side lane dividing line or the left-side lane dividing line is not detected, the driving support ECU 1 determines a lane dividing line, based on a width of a road surface which is travelled upon, and positions of the right-side lane dividing line and the left-side lane dividing line which have been previously detected by the driving support ECU 1. More specific description will be given by using, as an example, a road surface which is travelled upon as shown in FIG. 11.

Figure 11:
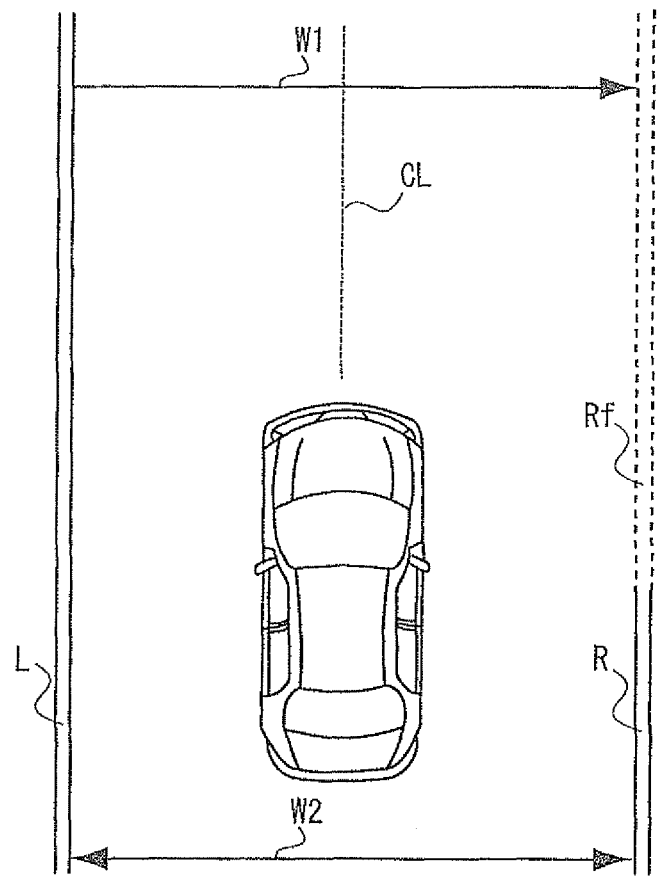
FIG. 11 is a diagram illustrating an exemplary road surface on which an own vehicle my is traveling.

FIG. 11 is a diagram illustrating an exemplary road surface on which the own vehicle my is travelling. As shown in FIG. 11, for example, it is assumed that a left-side lane dividing line L is drawn to the left of the own vehicle my, and a right-side lane dividing line R drawn to the right of the own vehicle my is broken. This state includes, for example, a state in which a color of the lane dividing line is too faint for the camera 2 to identify the lane dividing line, in addition to a state in which the lane dividing line is merely broken. In this case, the driving support ECU 1 sets a virtual line (a dashed line Rf in FIG. 11) at a position, to the right of the own vehicle my, that is distant, by a predetermined distance w1, from the left-side lane dividing line L having been detected. More specifically, for example, the driving support ECU 1 sets the virtual line Rf on the assumption that a right-side lane dividing line extends from a position at which the right-side lane dividing line R drawn to the right of the own vehicle my is broken, so as to be distant from the left-side lane dividing line L that has been detected, by a distance W2 between the right-side lane dividing line and the left-side lane dividing line having been previously detected (namely, in FIG. 11, the right-side lane dividing line R and the left-side lane dividing line L).

Further, in a second method in a process step of step S24, when either one of the right-side lane dividing line or the left-side lane dividing line is not detected, the driving support ECU 1 may set a virtual line by using the following method. In the following description, an exemplary case will be described with reference to FIG. 4 again showing a diverging section in which no lane dividing line is drawn on either one of the right side or the left side of the road surface which is travelled upon, as described above.

For example, as shown in FIG. 4, in a case where the diverging section appears to the right of the own vehicle my, and no lane dividing line is drawn in the diverging section, a section having no lane dividing line drawn therein appears to the own vehicle my traveling straight in a direction represented by an arrow arS in the figure. In this case, when the driving support ECU 1 determines, based on an image obtained from the camera 2, that the own vehicle my has reached a point (a point PcR in figure) at which the right-side lane dividing line R cannot be detected, a line obtained by extending the right-side lane dividing line R based on the right-side lane dividing line R having been previously obtained is set as the virtual line Rf.

As described above, also when either one of the right-side lane dividing line or the left-side lane dividing line is not detected, the driving support ECU 1 is allowed to set a virtual line by using the first method and/or the second method as described above. In other words, even when the own vehicle my is travelling straight in a lane in which either one of the right-side lane dividing line or the left-side lane dividing line is not drawn, the virtual line can be set by using the first method and/or the second method.

Further, at, for example, an intersection at which neither the right-side lane dividing line nor the left-side lane dividing line is drawn as illustrated in FIG. 10, the virtual line can be set particularly by using the second method. For example, as shown in FIG. 10, in this case, when the driving support ECU 1 determines, based on the image obtained from the camera 2, that the own vehicle my has reached a point at which neither the left-side lane dividing line L nor the right-side lane dividing line R is detected, lines obtained by extending the left-side lane dividing line L and the right-side lane dividing line R can be set as a virtual line Lf and a virtual line Rf, based on the left-side lane dividing line L and the right-side lane dividing line R, respectively, having been previously obtained. Also in the case shown in FIG. 10, the virtual line can be set in the first method described above, that is, based on a width of a road obtained from the lane dividing lines having been previously detected.

The first method and the second method are described on the assumption that the own vehicle my is travelling on the road surface in countries (for example, the U.S. and Europe) in which vehicles keep to the right side of the road. However, the present invention is not limited thereto. It should be understood that the first method and the second method described above are applicable to a case in which the own vehicle my travels on a road surface in countries (for example, Japan) in which vehicles keep to the left side of the road.

Returning to FIG. 3, the driving support ECU 1 sets, in step S25, a center line CL corresponding to a target track based on which the own vehicle my is to travel, by using the right-side lane dividing line R and the left-side lane dividing line L, or the virtual lines corresponding to the lines R and L. The driving support ECU 1 ends the process of the flow chart, and returns the process to step S15 shown in FIG. 2.

An exemplary process step performed by the driving support ECU 1 in step S25 will be described with reference to FIG. 11 again. The driving support ECU 1 obtains the lane width W1 based on the right-side lane dividing line R (or the virtual line Rf corresponding to the right-side lane dividing line R) and the left-side lane dividing line L (or the virtual line Lf corresponding to the left-side lane dividing line L) having been detected in previous process steps, and sets a line that passes through almost the center of the lane width W1 and extends along a direction in which the road surface that is travelled upon extends, as the center line CL that is the target track based on which the own vehicle my is to travel. The driving support ECU 1 ends the process of the flow chart shown in FIG. 3. Also on curves different from the straight road such as the road surface which is traveled upon as shown in each of FIG. 4 to FIG. 10, the driving support ECU 1 may set the center line CL corresponding to the target track by using, for example, a yaw rate sensor mounted to the own vehicle my.

Returning to FIG. 2, in step S15, the driving support ECU 1 obtains the vehicle information from the vehicle information obtaining device 4. The driving support ECU 1 advances the process to the subsequent step S16.

In step S16, the driving support ECU 1 determines whether or not the LDW control is necessary. When the determination is affirmative (YES) in step S16, the process is advanced to the subsequent step S17. When the determination is negative (NO), the process is returned to step S15.

Specifically, a case in which the determination is affirmative in step S16 is, for example, a case in which, based on the vehicle information having been obtained in step S15, and the road information having been calculated in step S14, the driving support ECU 1 determines that, for example, a front wheel of the own vehicle my reaches the right-side lane dividing line R (the virtual line Rf corresponding to the right-side lane dividing line R), or the left-side lane dividing line L (the virtual line Lf of the left-side lane dividing line L), when a predetermined time period elapses.

Even in a case where the driving support ECU 1 determines, in step S16, that the front wheel of the own vehicle my reaches the right-side lane dividing line R (the virtual line Rf corresponding to the right-side lane dividing line R) or the left-side lane dividing line L (the virtual line Lf corresponding to the left-side lane dividing line L) when the predetermined time period elapses, if, for example, the LDW operation conditions shown in FIG. 12 are not satisfied, or when LDW temporal stopping conditions described below are satisfied, negative determination (NO) is made in step S16.

Specifically, even in a case where the driving support ECU 1 determines that the LDW control is necessary, for example, if an LKA switch is not ON (D1$a$ in FIG. 12), if the own vehicle my is not travelling at a speed less than or equal to a predetermined speed v1 (D1$b$ in FIG. 12), if the right-side lane dividing line R (or the virtual line Rf corresponding to the right-side lane dividing line R), and the left-side lane dividing line L (or the virtual line Lf corresponding to the left-side lane dividing line L) are not identified (D1$c$ in FIG. 12), as shown in FIG. 12, the LDW control is not performed. The predetermined speed v1 described above is not limited to any specific speed. However, the predetermined speed v1 is, for example, set to range from about 50 km/h to about 60 km/h.

Further, if a driver of the own vehicle my intentionally performs a steering operation in order to change lanes, if a turn signal is on in order to, for example, change lanes, if a braking operation is performed in order to, for example, stop the own vehicle my, if a windshield wiper is being operated, or if a system is abnormal, the LDW operation conditions are not satisfied. Namely, even in a case where the driving support ECU 1 determines that the front wheel of the own vehicle my reaches the right-side lane dividing line R (the virtual line Rf corresponding to the right-side lane dividing line R), or the left-side lane dividing line L (the virtual line Lf corresponding to the left-side lane dividing line L) when the predetermined time period elapses, if D1$a$ to D1$h$ of the LDW operation conditions shown in FIG. 12 are not satisfied, the LDW control is not performed.

When the determination is affirmative (YES) in step S16, namely, when, for example, the driving support ECU 1 determines that the front wheel of the own vehicle my reaches the right-side lane dividing line R (the virtual line Rf corresponding to the right-side lane dividing line R), or the left-side lane dividing line L (the virtual line Lf corresponding to the left-side lane dividing line L) when the predetermined time period elapses, the driving support ECU 1 determines, in the subsequent step S17, whether or not the lane dividing line that is reached by the front wheel of the own vehicle my when the predetermined time period elapses is a virtual line. When the driving support ECU 1 makes a negative determination (NO) in step S17, the process is advanced to step S18. On the other hand, when the driving support ECU 1 makes an affirmative determination (YES) in step S17, namely, when the lane dividing line that is reached by the front wheel of the own vehicle my when the predetermined time period elapses is a virtual line, the process is advanced to step S19.

In step S18, the driving support ECU 1 performs the LDW control using the display device 6 or the sound output device 7 so as to issue a warning for notifying a driver of the own vehicle my that the own vehicle my is likely to deviate from a traveling lane on which the own vehicle my is to travel. The driving support ECU 1 advances the process to step S20.

When the determination is affirmative (YES) in step S17, the driving support ECU 1 determines whether or not a warning for the virtual line is to be issued in the subsequent step S19. Specifically, the driving support ECU 1 determines, in step S19, whether or not a warning for the virtual line is to be issued, according to the LKA operation state for the virtual line.

Figure 13:
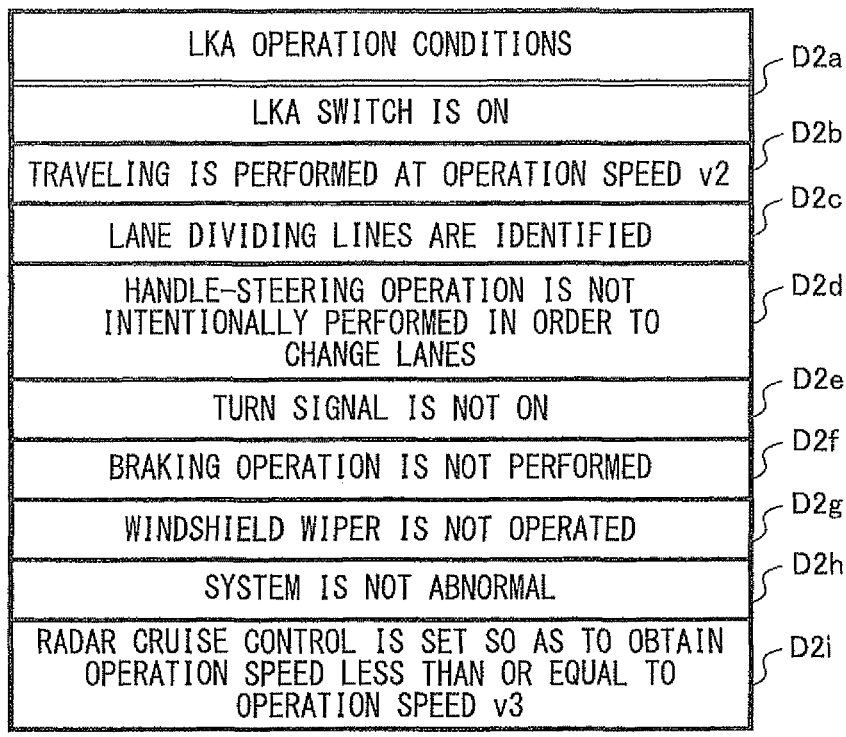
FIG. 13 is a diagram illustrating exemplary LKA operation conditions.

A typical LKA operation state will be briefly described. FIG. 13 illustrates exemplary LKA operation conditions. When, for example, the LKA operation conditions D2$a$ to D2$i$ as shown in FIG. 13 are all satisfied, the driving support ECU 1 is allowed to perform the LKA control. Specifically, firstly, the LKA switch is to be ON in order to perform the LKA control (D2$a$ in FIG. 13). The own vehicle my needs to be travelling at a speed less than or equal to a predetermined speed v2, and the right-side lane dividing line R (or the virtual line Rf corresponding to the right-side lane dividing line R) and the left-side lane dividing line L (or the virtual line Lf corresponding to the left-side lane dividing line L) need to be identified (D2$b$ and D2$c$ in FIG. 13).

Further, in general, the LKA control is performed on the assumption that, for example, the own vehicle my is travelling on a road dedicated to automobiles, or the like. The predetermined speed v2 described above is set to be higher than or equal to about 70 km/h (specifically, range from about 65 km/h to about 100 km/h). The LKA control is performed such that, when, for example, the own vehicle my is travelling on a road dedicated to automobiles, or the like, the EPS 5 or the like is controlled to apply a low steering force and support a steering operation performed by a driver of the own vehicle my, in order to cause the own vehicle to run near the center of the lane (near the center line CL corresponding to the target track), thereby reducing a burden on the driver. Therefore, when the driver of the own vehicle my intentionally performs a steering operation in order to change lanes, when a turn signal is used in order to, for example, change lanes, or when, for example, a braking operation is performed to stop, the LKA control is not performed. In other words, as shown in FIG. 13, the operation conditions D2$d$ to D2$f$ need to be satisfied in order to perform the LKA control.

Further, when a windshield wiper is operated, the LKA control is not performed. For example, in a state where a driver needs to operate a windshield wiper, it is generally considered that it is raining. Therefore, in a case where the driving support ECU 1 takes, by using the camera 2, an image of a road surface on which the own vehicle my is traveling when it is raining, in order to, for example, identify the lane dividing line or the like, an accuracy for the identification may be reduced. On the other hand, the LKA control is performed so as to, for example, dynamically control the own vehicle my by controlling the EPS 5 or the like, for supporting a steering operation of the driver of the own vehicle my. Therefore, it is necessary to identify the lane dividing line or the like with an enhanced accuracy. Thus, when it is predicted that the accuracy for identification may be reduced because, for example, it rains, the LKA control is not performed. In other words, in order to perform the LKA control, as shown in FIG. 13, the operation condition D2$g$ needs to be further satisfied.

Also when the LKA control system is abnormal, and a radar cruise control is not set so as to obtain the operation speed less than or equal to v3, the LKA control is not performed. In other words, in order to perform the LKA control, as shown in FIG. 13, the operation conditions D2$h$ to D2$i$ need to be further satisfied.

The radar cruise control is a control in which, based on the information obtained from the radar device 3 mounted to the own vehicle my, a preceding vehicle travelling in front of the own vehicle my is identified, and a brake device mounted to the own vehicle my, or the like is controlled so as to maintain a distance between the vehicles according to vehicle speeds while a speed less than or equal to a preset speed is maintained. Also in the radar cruise control, a speed can be preset. Therefore, a speed that is preset in the radar cruise control needs to be set as the predetermined speed v2.

Further, when, for example, at least about a half of the own vehicle my is outside the lane dividing line, or when it is determined that a driver is driving with his/her hands free, the LKA control is not performed. Namely, if the LKA control is being performed, the LKA control is temporarily stopped (LKA temporal stopping condition).

As described above, when the LKA operation conditions shown in FIG. 13 are all satisfied, and the LKA temporal stopping condition as described above is not satisfied, the driving support ECU 1 is allowed to perform the LKA control.

Returning to description of the process step of step S19 shown in FIG. 2, the driving support ECU 1 makes determination, in step S19, according to the LKA operation state described above. Specifically, when the LKA operation conditions as described above are all satisfied, and the LKA temporal stopping condition as described above is not satisfied, the driving support ECU 1 makes an affirmative determination (YES) in step S19, namely, determines that a warning for the virtual line is to be issued.

The driving support ECU 1 performs, in step S18, the LDW control by using the display device 6 and the sound output device 7 so as to issue a warning for notifying a driver of the own vehicle my that the own vehicle my is likely to deviate from a traveling lane in which the own vehicle is to travel.

On the other hand, when all of the LKA operation conditions are not satisfied, or the LKA temporal stopping condition is satisfied, the driving support ECU 1 makes a negative determination (NO) in step S19, namely, determines that a warning for the virtual line is not issued.

As described above, also when it is determined that the LDW control needs to be performed, the LDW control depends on whether the lane dividing line that is reached by the front wheel of the own vehicle my when a predetermine time period elapses is a real line or a virtual line. Namely, in a case where the lane dividing line that is reached by the front wheel of the own vehicle my when the predetermined time period elapses is a real line, if the LDW operation conditions shown in FIG. 12 are satisfied, the LDW control is performed regardless of the determination of step S19.

The LDW operation conditions shown in FIG. 12 are merely examples. For example, the conditions may be set as follows. As described above, the LDW control is performed by using the display device 6 or the sound output device 7 in order to issue a warning for notifying a driver of the own vehicle my that the own vehicle my is likely to deviate from a travelling lane in which the own vehicle my is to travel. This is an important control for forestalling a danger in a state where safety is endangered, for example, in a state where an accident is likely to occur.

When, for example, a windshield wiper is being operated, all of the LDW operation conditions shown in FIG. 12 are not satisfied. However, also when the windshield wiper is being operated in the case of a real line being detected, all of the LDW operation conditions shown in the FIG. 12 may be determined to be satisfied. Namely, the LDW control may be performed regardless of D1g among the LDW operation conditions. In general, when a driver needs to operate the windshield wiper, it is considered that it is raining. Therefore, in a case where the driving support ECU 1 takes, by using the camera 2, an image of the road surface on which the own vehicle my is travelling, and, for example, identifies the lane dividing line or the like when it is raining, an accuracy for identification may be reduced. In the LKA control, for example, by controlling the EPS 5 or the like, the own vehicle my is dynamically controlled so as to support a steering operation performed by a driver of the own vehicle my. Therefore, since, for example, the lane dividing line or the like needs to be identified with an enhanced accuracy, when it is predicted that the accuracy for identification is reduced because of rainy weather, the LKA control is not be performed. On the other hand, the LDW control is performed by using the display device 6 or the sound output device 7 in order to issue a warning for notifying the driver of the own vehicle my that the own vehicle my is likely to deviate from a travelling lane in which the own vehicle my is to travel. This is an important control for forestalling a danger in a state where safety is endangered, for example, in a state where an accident is likely to occur. Therefore, even if an accuracy for identifying the lane dividing line having been obtained by the camera 2 in rainy weather, is not high enough to be required in the LKA control, the LDW control may be performed.

Further, when a driver intentionally performs a steering operation, the LDW operation conditions shown in FIG. 12 are not satisfied. However, when the driver intentionally performs the steering operation in the case of a real line being detected, all of the LDW operation conditions shown in FIG. 12 may be determined to be satisfied. Namely, the LDW control may be performed regardless of D1d among the LDW operation conditions. When, for example, the driver of the own vehicle my performs a steering operation for avoiding an obstacle in front of the own vehicle my, the own vehicle my may deviate from a line corresponding to the target track based on which the own vehicle my is to travel. At this time, in a case where the steering operation is performed in order to avoid the obstacle in front of the own vehicle my, if the LKA control is performed, a driver feels bothered. Therefore, in a case where the driver intentionally performs a steering operation, the LKA control is not performed, as shown in FIG. 13. On the other hand, when, for example, the driver of the own vehicle my performs the steering operation in order to avoid the obstacle in front of the own vehicle my, and deviates from the lane dividing line and approaches the opposing lane, the LDW control for forestalling a danger in a state where safety is endangered, for example, in a state where an accident is likely to occur, may be performed.

The driving support ECU 1 determines in step S20 shown in FIG. 2 whether or not the process of the flow chart is to be ended. When, for example, an ignition switch of a vehicle having the driving support apparatus mounted thereto is set as OFF, the driving support ECU 1 ends the process of the flow chart. On the other hand, when the driving support ECU 1 determines that the process is to be continued, the process is returned to step S12, and the process is repeated.

In the process of the flow chart shown in FIG. 2, whether or not the lane keeping control is to be started is determined in step S13. When, for example, the LKA main switch is pressed by a driver, the determination is affirmative (YES). In the subsequent step S14, when neither the right-side lane dividing line nor the left-side lane dividing line have been detected, or when only one of the right-side lane dividing line or the left-side lane dividing line has been detected, a virtual line is set. However, as described above, whether or not a warning for the virtual line is to be issued, is determined according to the LKA operation state. Therefore, for example, when neither the right-side lane dividing line nor the left-side lane dividing line have been detected, or when only one of the right-side lane dividing line or the left-side lane dividing line has been detected, if the LKA operation conditions are not satisfied, or if the temporal stopping condition is satisfied, the virtual line may not be set, or otherwise a distance over which the virtual line is set to be drawn may be reduced as compared to when the LKA operation conditions are satisfied.

Further, in step S17 of the flow chart shown in FIG. 2, the driving support ECU 1 determines whether or not the lane dividing line that is reached by the front wheel of the own vehicle my when a predetermined time period elapses is a virtual line. At this time, for example, the driving support ECU 1 may perform the process step of step S17 in consideration of a length (distance) of the virtual line. Namely, in a case where the lane dividing line that is reached by the front wheel of the own vehicle my when the predetermined time period elapses is a virtual line, the driving support ECU 1 may further determine whether or not the length (distance) of the virtual line is longer than a predetermined distance. In a case where the lane dividing line that is reached by the front wheel of the own vehicle my when the predetermine time period elapses is a virtual line, and the length (distance) of the virtual line is longer than the predetermined distance, the driving support ECU 1 may make an affirmative determination (YES) in step S17.

As described above, the driving support ECU 1 may change a warning issued for a driver according to a traveling environment of the own vehicle my. Determination as to whether or not the LDW control is to be performed is described on the assumption of more specific scenes as illustrated in FIG. 4 to FIG. 10. For example, a diverging section, as shown in FIG. 4, in which (i) the lane dividing line is not drawn on one of the right side or the left side of the road surface which is traveled upon, will be firstly described as an example.

In FIG. 4, it is assumed that the driving support ECU 1 determines, at a position A, that, for example, the LDW control needs to be performed for the own vehicle my being under the LKA control (YES in step S16 shown in FIG. 2). In this case, the right-side lane dividing line R and the left-side lane dividing line L are each a real line at the position A at which the own vehicle my is travelling. Therefore, the determination is negative (NO) in step S17 shown in FIG. 2, and the LDW control is performed by using the display device 6 or the sound output device 7 so as to issue a warning for notifying a driver of the own vehicle my that the own vehicle is likely to deviate from the travelling lane.

As described with reference to FIG. 12 and FIG. 13, in a case where a windshield wiper is being operated, the LKA control is not performed. However, the LDW control may be performed by using the display device 6 or the sound output device 7 so as to issue a warning for notifying the driver of the own vehicle my that the own vehicle is likely to deviate from the traveling lane, as described above. Further, also when the driver of the own vehicle my intentionally performs a steering operation in order to change lanes, the LKA control is not performed. However, the LDW control may be performed by using the display device 6 or the sound output device 7 so as to issue a warning for notifying the driver of the own vehicle my that the own vehicle is likely to deviate from the travelling lane. Further, also when the own vehicle my is not traveling at a speed less than or equal to the predetermined speed v2 which is one of the LKA operation conditions, if the own vehicle my is traveling at a speed less than or equal to the predetermined speed v1 which is one of the LDW operation conditions, the LDW control is performed by using the display device 6 or the sound output device 7 so as to issue a warning for notifying the driver of the own vehicle my that the own vehicle is likely to deviate from the traveling lane, although the LKA control is not performed.

In FIG. 4, it is assumed that the own vehicle my then travels straight in a direction represented by an arrow arS in the figure, to reach a position B, and the own vehicle my attempts to travel, at the position B, in a direction represented by an arrow arR in the figure, that is, in a direction represented by a virtual line Rf, and the driving support ECU 1 determines that the LDW control needs to be performed (YES in step S16 shown in FIG. 2). In this case, at the position B at which the own vehicle my is traveling, the right-side lane dividing line is the virtual line Rf, and therefore the determination is affirmative (YES) in step S17 shown in FIG. 2. In step S19 shown in FIG. 2, the driving support ECU 1 determines whether or not a warning for the virtual line Rf is necessary. Specifically, when the LKA operation conditions are all satisfied, and the LKA temporal stopping condition is not satisfied, the driving support ECU 1 performs the LDW control by using the display device 6 or the sound output device 7 so as to issue a warning for notifying the driver of the own vehicle my that the own vehicle is likely to deviate from the traveling lane.

More specifically, at the position B shown in FIG. 4, in a case where, for example, one of the LKA operation conditions shown in FIG. 13 is not satisfied (for example, when a steering operation is intentionally performed in order to change lanes) because of an operation performed by the driver of the own vehicle my, even if it is determined that the front wheel of the own vehicle my reaches the virtual line Rf when the predetermined time period elapses, the LDW control is not performed. On the other hand, as described in step S17 shown in FIG. 2, in a case where the steering operation is intentionally performed in order to change lanes, if the line that is reached when the predetermined time period elapses is a real line, the LDW control may be performed.

Thus, for example, in the diverging section shown in FIG. 4, even when the driver of the own vehicle my performs a steering operation in order to travel in the direction represented by the arrow arR shown in FIG. 4, the LDW control is not performed. In other words, in a case where a result of determination as to whether or not the LDW control is to be performed is not different according to whether the lane dividing line that is reached by the front wheel of the own vehicle my when the predetermined time period elapses is a real line or a virtual line, when, for example, in the diverging section shown in FIG. 4, the driver of the own vehicle my performs the steering operation in order to travel in the direction represented by the arrow arR in FIG. 4, the virtual line Rf is determined to be a real line, and an unnecessary LDW control may be performed in a place where no lane dividing line is drawn in practice.

Namely, in the diverging section shown in FIG. 4, in a case where the driver of the own vehicle my performs the steering operation so as to travel in the direction represented by the arrow arR shown in FIG. 4, and travels in the diverging direction, the front wheel of the own vehicle my inevitably reaches the lane dividing line. However, in this case, a warning is unnecessary. Therefore, in this case, in a place in which no real line is drawn, the LDW control is not performed, and a driver's feeling of unreasonableness caused by the LDW control being performed in a section in which no real line is drawn, can be alleviated.

The same can be said for, for example, (ii) a lane addition section on the road surface which is travelled upon, such as a section in which a passing lane appears to the left of the own vehicle my as shown in FIG. 7, or (iv) a section in which neither the right-side lane dividing line nor the left-side lane dividing line is detected, such as an intersection shown in FIG. 10.

Next, as a more specific scene, (iii) a section in which a lane width on the road surface which is traveled upon is changed, such as an exit section S1 of the carpool lane as shown in FIG. 8, will be described, as an example, as to whether or not the LDW control is to be performed for such a section.

In FIG. 8, it is assumed that the driving support ECU 1 determines at a position C that, for example, the LDW control needs to be performed on the own vehicle my being under the LKA control (YES in step S16 shown in FIG. 2). In this case, since the right-side lane dividing line R and the left-side lane dividing line L at the position C at which the own vehicle my is traveling are real lines, the determination is negative (NO) in step S17 shown in FIG. 2, and the LDW control is performed by using the display device 6 or the sound output device 7 so as to issue a warning for notifying a driver of the own vehicle my that the own vehicle is likely to deviate from the traveling lane.

In FIG. 8, it is assumed that the own vehicle my then travels straight in a direction represented by an arrow arS in figure, to reach a position D, and, at the position D, the own vehicle my attempts to travel in a direction represented by an arrow arR in figure, that is, in the direction of the virtual line Rf, and the driving support ECU 1 determines that the LDW control is necessary (YES in step S16 shown in FIG. 2). In this case, since, at the position D at which the own vehicle my is traveling, the right-side lane dividing line is the virtual line Rf, the determination is affirmative (YES) in step S17 shown in FIG. 2. In step S19 shown in FIG. 2, the driving support ECU 1 determines whether or not a warning for the virtual line Rf is necessary. Specifically, in a case where the LKA operation conditions are all satisfied, and the LKA temporal stopping condition is not satisfied, the driving support ECU 1 performs the LDW control by using the display device 6 or the sound output device 7 so as to issue a warning for notifying the driver of the own vehicle my that the own vehicle is likely to deviate from the traveling lane.

More specifically, at the position D shown in FIG. 8, in a case where, for example, one of the LKA operation conditions shown in FIG. 13 is not satisfied (for example, when a steering operation is intentionally performed in order to change lanes) because of an operation performed by the driver of the own vehicle my, even if it is determined that the front wheel of the own vehicle my reaches the virtual line Rf when the predetermined time period elapses, the LDW control is not performed.

As described above, when the steering operation is intentionally performed in order to change lanes, if a line that is reached when the predetermined time period elapses is a real line, the LDW control may be performed. Namely, it is assumed that, in the exit section for the carpool lane as shown in FIG. 8, for example, the steering operation is intentionally performed in order to change lanes. In this case, the LDW control is not performed for the virtual line Rf shown in FIG. 8. However, as described with reference to FIG. 12 and FIG. 13, in a case where the windshield wiper is being operated, although the LKA control is not performed, the LDW control may be performed by using the display device 6 or the sound output device 7 so as to issue a warning for notifying the driver of the own vehicle my that the own vehicle is likely to deviate from the travelling lane.

Further, also when the driver of the own vehicle my intentionally performs the steering operation in order to change lanes, although the LKA control is not performed, the LDW control may be performed by using the display device 6 or the sound output device 7 so as to issue a warning for notifying the driver of the own vehicle my that the own vehicle is likely to deviate from the traveling lane. Further, also when the own vehicle my is not travelling at a speed less than or equal to the predetermined speed v2 which is one of the LKA operation conditions, if the own vehicle my is travelling at a speed less than or equal to the predetermined speed v1 which is one of the LDW operation conditions, the LDW control is performed by using the display device 6 or the sound output device 7 so as to issue a warning for notifying the driver of the own vehicle my that the own vehicle is likely to deviate from the traveling lane, although the LKA control is not performed. Namely, the LDW control may be performed for the lane diving line that is drawn to the right of the own vehicle my that has exited from the carpool lane, that is, for a real line R2.

The same can be said for a section for boarding or exiting a bus at a bus stop as shown in FIG. 9.

The manner described above in the embodiment is merely illustrative, and the technical scope of the present invention is not limited thereto. Therefore, any structure can be adopted within a scope in which the effects of the present invention are obtained.

INDUSTRIAL APPLICABILITY

The driving support apparatus and the driving support method according to the present invention are useful as, for example, a driving support apparatus and a driving support method that are implemented in vehicles, and that can change a warning for a driver according to vehicle traveling environments.

DESCRIPTION OF THE REFERENCE CHARACTERS

1 . . . driving support ECU
2 . . . camera
3 . . . radar device
4 . . . vehicle information obtaining device
5 . . . EPS
6 . . . display device
7 . . . sound output device

The invention claimed is:

1. A driving support apparatus that performs a driving support for causing a vehicle to travel in a lane, the driving support apparatus comprising:
 an image taking section configured to take an image of a road surface which is travelled upon and is in front of the vehicle;
 an image processing section configured to detect a lane dividing line on the road surface, which is travelled upon, by using the image taken by the image taking section, and set a virtual lane dividing line in a section of the road surface in which no lane dividing line is detected;
 a support section configured to perform the driving support by controlling the vehicle so as to prevent the vehicle from deviating from a lane defined by at least one of the lane dividing line and the virtual lane dividing line; and
 a warning section configured to issue a warning when it is determined that the vehicle is likely to deviate from the defined lane;

wherein
when the support section is in operation, the warning section is actuated when it is determined that the vehicle is likely to deviate from the virtual lane dividing line, and when the support section is not in operation, the warning section is not actuated when it is determined that the vehicle is likely to deviate from the virtual lane dividing line, and the warning section does not output a warning even when a front wheel of the vehicle reaches the virtual lane dividing line.

2. The driving support apparatus according to claim 1, wherein a condition when the support section is not in operation is a condition that at least one of a windshield wiper of the vehicle, an operation of a steering wheel of the vehicle, a speed of the vehicle, a turn signal, and an operation of a brake, is in a predetermined state.

3. The driving support apparatus according to claim 2, wherein the condition when the support section is not in operation is a condition that the vehicle is in at least one of a state in which the windshield wiper is operating, a state in which a steering torque of the steering wheel indicates a value greater than a predetermined value, a state in which the speed of the vehicle indicates a value within a predetermined range, a state in which the turn signal is operating, and a state in which the brake is being operated.

4. The driving support apparatus according to claim 1, wherein, when the image processing section does not detect the lane dividing line, the image processing section sets, as the virtual lane dividing line, a line obtained by extending the lane dividing line having been most recently detected, on a same side on which the lane dividing line has been most recently detected.

5. The driving support apparatus according to claim 1, wherein, when the image processing section does not detect one of the lane dividing line on a right side and the lane dividing line on a left side, the image processing section sets the virtual lane dividing line at a position that is distant from a position of the other of the lane dividing lines, which has been detected, by a distance between a right side lane dividing line and a left side lane dividing line which have been previously detected.

* * * * *